May 6, 1958
J. F. HENEHAN
2,833,363
RETAINER MEANS FOR BATTERIES AND THE LIKE
Filed Oct. 7, 1955
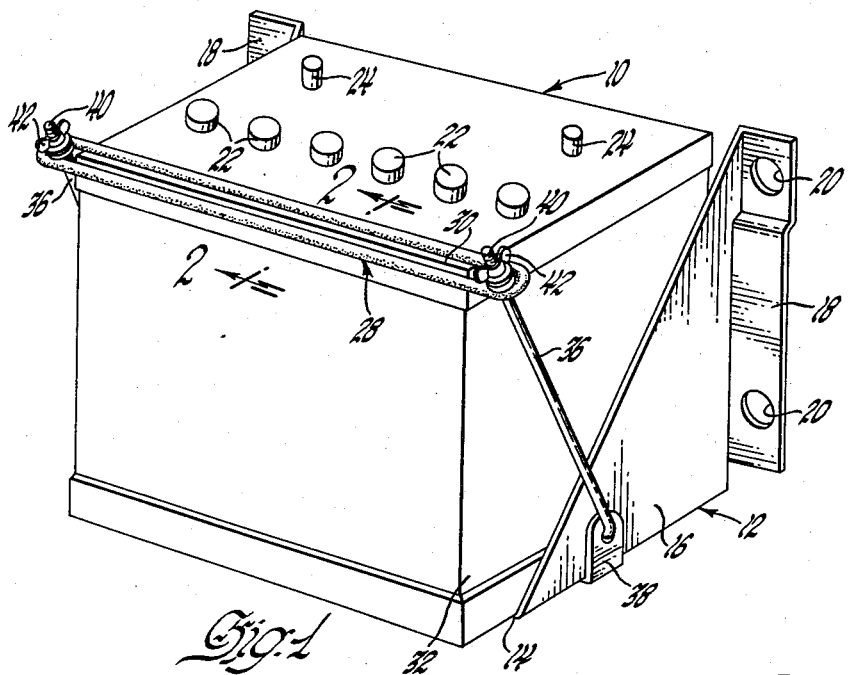
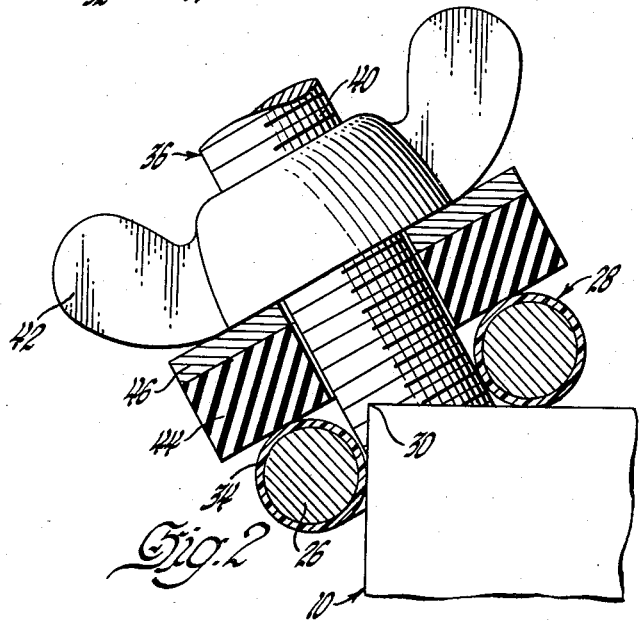
INVENTOR.
John F. Henehan
BY
L. D. Burch
ATTORNEY

United States Patent Office 2,833,363
Patented May 6, 1958

2,833,363

RETAINER MEANS FOR BATTERIES AND THE LIKE

John F. Henehan, Detroit, Mich., assignor to General Motors Corporation, Detroit, Mich., a corporation of Delaware Application October 7, 1955, Serial No. 539,190

5 Claims. (Cl. 180—68.5)

This invention relates generally to means for retaining objects within supporting members and particularly to means for holding car batteries within battery receiving trays.

Batteries used in automotive vehicles are generally mounted within a supporting tray which is secured to the fire wall, wheel housing, or such within the engine compartment of the vehicle in a manner permitting ready access thereto and easy removal thereof when necessary. The means used to hold the battery within the tray must secure the battery firmly in place against accidental displacement, not obstruct access to the filler caps or interfere with the terminal posts, and should be reasonably simple and inexpensive to manufacture.

It is here proposed to provide means for positively and securely retaining a car battery or other object within a receiving tray and which include the aforementioned features. Such means in one of its more simple forms comprises a retainer member formed to include or provide an elongated opening or closed loop and, when used with car batteries where interference with the terminal posts would be objectionable, which is preferably coated with plastic or other insulating material. The opening or elongated loop is formed to receive an edge of the member to be secured in place and is adapted to extend beyond the ends thereof. Tie means, which are secured to the receiving or supporting tray member, are received through the ends of the retainer, which extend beyond the ends of the member to be secured to the tray, for engaging the retainer to such members. Resilient means are engaged with the tie means and are stressed or loaded during installation to provide slack adjusting means for the tie means due to later relative shifting of the battery or tray members. The retainer is held to the battery or other object by the tie rods and acts to seat such object securely within the receiving tray to prevent other than intentional removal.

In the drawings:

Figure 1 is a schematic illustration of the proposed retainer means as used with a car battery.

Figure 2 is an enlarged cross-sectional view of the proposed retainer as seen in the plane of line 2—2 of Figure 1 looking in the direction of the arrows thereon.

An automobile battery 10 is shown as secured within a supporting tray 12 which includes a base 14 extending under the battery, diagonally cut side walls 16, and flanges 18 by means of which the tray may be secured to another structure, which acts to form the back wall of the tray, as with bolts extending through the bolt holes 20 provided through the flanges 18.

The battery 10 is shown as being rectangular in shape and includes filler caps 22 and terminal posts 24.

Bar stock, strap or rod material 26 is formed to provide an elongated open loop retainer 28 received over the forward upper edge 30 of the battery member 10 and extending beyond the end walls 32 thereof. In the present instance, the loop retainer 28 is shown to be coated with an insulating material 34 such as plastic or the like to guard against accidental contact with the battery filler caps 22 or terminal posts 24.

Tie rods 36 are pivotally secured to the supporting tray 12 near the lower back edge of the tray and on each side thereof, as to side wall 16 or brace 38 extending under the base of the tray. The tie rods are received through the ends of the loop retainer 28 which extend beyond the end walls 32 of the battery and are threaded at the outer ends, as at 40, to receive wing nut or other fastening means 42.

Disposed between the fastening means 42 and the retainer 28 are resilient means, here bushings 44 having washers 46 disposed thereover, which are compressed upon tightening down the fastening means upon the tie rods. The bushings 44 act to hold the fastening means under tension on the tie bolts or rods even though the battery or tray may shift within allowable installation tolerances by expanding as required to make necessary slack adjustment.

With the battery 10 disposed in the tray 12 and the tray mounted on a suitable bulkhead, not here shown, the loop retainer 28 is held to the edge 30 of the battery by tightening down the wing nuts 42 on tie rods 36. This seats the battery within the tray with the lower back edge of the battery, not shown in the drawings, securely held within the closed back edge of the tray, formed by the tray base 14, side walls 16 and bulkhead to which the tray is secured, by the forces acting diagonally through the battery. The bushings 44 are adapted to make any slack adjustment necessary as a result of the shifting of the battery within the tray due to careless installation or accidental shifting of the battery.

I claim:

1. Means for securing an object within a receiving tray which includes, a member receivable about a corner edge of said object and extending beyond the ends thereof, said member having an elongated opening formed therein for receiving said corner edge therethrough, and adjustable means engaged with said tray and the ends of said member for holding said member in engagement with the surfaces of said object forming said corner edge and holding said object to said tray.

2. Means for securing an object within a receiving tray as provided by claim 1 wherein said member receivable about a corner edge of said object is a rod member formed to provide an elongated closed loop and said holding means are received within the ends of said closed loop extending beyond the ends of said object.

3. Means for securing an object within a receiving tray as provided by claim 2 wherein said member is coated with a resilient and non-conductive material to provide insulation between said object and said holding means and for slack adjustment as regards the engagement of said holding means therewith.

4. Battery retainer means comprising a wall bracket attachable to a vehicle wall panel and having surfaces at right angles to each other for supporting a battery member adjacent said panel with a corner edge of said battery member positioned to engage said panel, an elongated member receivable about the corner edge of said battery member diagonally opposite said first-mentioned corner edge and extending beyond the ends of said battery member, said member having an elongated opening formed therein and between the ends thereof for receiving said last-mentioned corner edge therethrough, and tie means engaged with said bracket and extended through the ends of said opening in said elongated member extending past the ends of said battery member for holding said elongated member in engagement with the side walls forming said last-mentioned corner edge of said battery and thereby holding said battery member to said bracket.

5. The battery retainer means of claim 4 wherein said bracket is formed to receive the lower corner edge of a battery member next adjacent said wall panel and said elongated member is disposed to receive the diagonally opposite forward and upper corner edge thereof, said elongated member being coated with a non-corrosive and resilient material for insulating said tie means from contact with the top of said battery member and for providing limited slack adjustment as regards the engagement of said tie means therewith.

References Cited in the file of this patent
UNITED STATES PATENTS

| | | |
|---|---|---|
| 1,469,595 | Hick | Oct. 2, 1923 |
| 1,608,856 | Masury | Nov. 30, 1926 |
| 1,636,562 | Hick | July 19, 1927 |
| 2,402,682 | Shriro et al. | June 25, 1946 |
| 2,488,360 | Williams | Nov. 15, 1949 |

FOREIGN PATENTS

| | | |
|---|---|---|
| 556,687 | France | Apr. 18, 1923 |
| 647,562 | Great Britain | Dec. 13, 1950 |